United States Patent [19]

Hodge

[11] Patent Number: 4,903,529

[45] Date of Patent: Feb. 27, 1990

[54] VALVE SYSTEM ANALYZER

[75] Inventor: James A. Hodge, Gray, Ga.

[73] Assignee: Westinghouse Electric Corp., Pittsburgh, Pa.

[21] Appl. No.: 254,650

[22] Filed: Oct. 7, 1988

[51] Int. Cl.$^4$ .......................................... G01M 19/00
[52] U.S. Cl. .......................................... 73/168; 73/37
[58] Field of Search ................. 73/168, 46, 49.8, 49.3, 73/37

[56] References Cited

U.S. PATENT DOCUMENTS

| | | | |
|---|---|---|---|
| 2,098,677 | 11/1937 | Saballus et al. | 73/168 X |
| 3,861,209 | 1/1975 | Amies | 73/168 |
| 3,942,375 | 3/1976 | Shepherd | 73/168 |
| 3,975,944 | 8/1976 | Aprily, Jr. | 73/168 X |
| 4,181,017 | 1/1980 | Markle | 73/168 |
| 4,722,221 | 2/1988 | Jerguson | 73/49.8 |
| 4,821,769 | 4/1989 | Mills et al. | 73/49.8 X |

Primary Examiner—Daniel M. Yasich
Attorney, Agent, or Firm—B. R. Nath

[57] ABSTRACT

A method for testing an hydraulic device of an hydraulic control system, the system having a source of hydraulic fluid under pressure and a fluid reservoir, and the device having a fluid inlet which is releasably coupled to the source when the system is in operation, a fluid outlet which is releasably coupled to the reservoir when the system is in operation, and an element which restricts fluid flow between the inlet and the outlet, by: halting operation of the system; providing a portable analyzing apparatus having a supply of hydraulic fluid, an outlet conduit, a unit for supplying hydraulic fluid under pressure from the supply to the outlet conduit, a return conduit communicating with the supply, a fluid pressure monitor connected to the outlet conduit, and a fluid flow monitor in the return conduit; disconnecting the fluid inlet of the device from the source and connecting that fluid inlet to the outlet conduit; disconnecting the fluid outlet of the device from the reservoir and connecting that fluid outlet to the return conduit; placing the unit for supplying hydraulic fluid under pressure into operation for supplying hydraulic fluid under pressure to the outlet conduit; and monitoring the fluid pressure in the outlet conduit and the flow of fluid through the return conduit with the monitors.

6 Claims, 2 Drawing Sheets

VALVE SYSTEM ANALYZER

BACKGROUND OF THE INVENTION

The present invention relates to the testing of hydraulic fluid systems.

The satisfactory operation of hydraulic fluid control systems depends on the integrity of their sealing components and the failure of even one such component can seriously impair the operating characteristics of the hydraulic system. In particular, the failure of one or more sealing components can result in a significant reduction in system pressure, preventing proper operation of the devices, such as valves, which are controlled by the system.

Current practice in the industry is to perform scheduled preventive maintenance of critical parts. Failures which do not prevent operation of the system are usually ignored until an operating failure occurs, at which time suspected components of the hydraulic fluid system are replaced one at a time and after each replacement, the installation is placed back into operation to determine whether the replaced component is the one responsible for the system failure.

In any event, each failure of the hydraulic control system requires shutdown of the installation, with attendant lose of productivity.

Many installations of the type hereunder consideration must undergo periodic shutdown for various reasons unrelated to the operating state of the hydraulic control system. If, during these shutdown periods, components of the hydraulic control system which have begun to fail but continue to be at least marginally operative were located, then these components could be replaced to thereby avoid the need for subsequent, unscheduled shutdowns.

SUMMARY OF THE INVENTION

It is a primary object of the present invention to analyze the components of the hydraulic control system of such an installation during scheduled shutdown periods.

Another object of the invention is to perform such analyses without removing the hydraulic system components from the installation.

Yet another object of the invention is to perform such analyses on subcomponents of hydraulic system components which are found to be at the beginning of failure.

DESCRIPTION OF THE PREFERRED EMBODIMENTS

Figure 1:
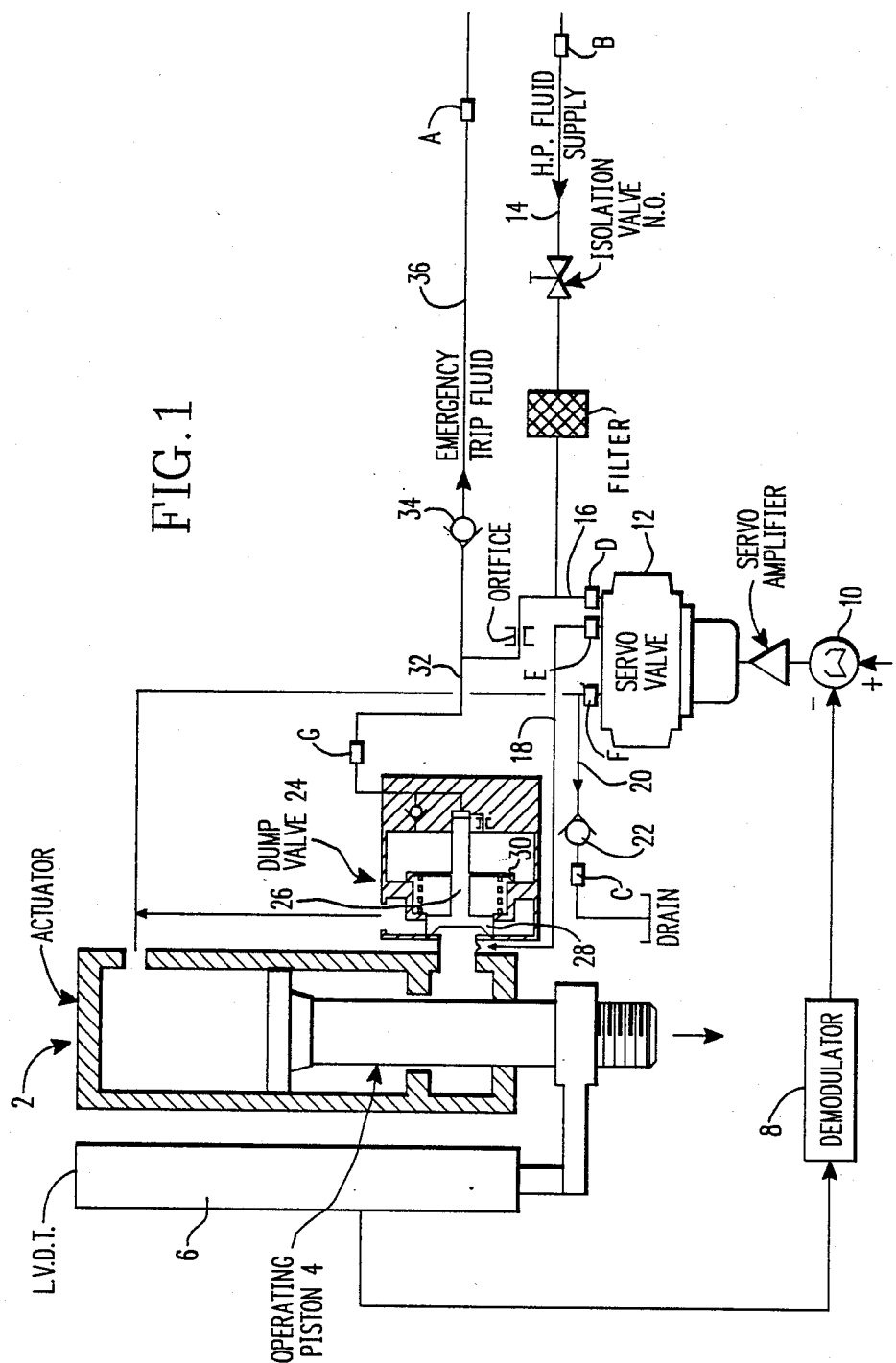
FIG. 1 is a simplified view, partly in cross section and partly schematic, of one hydraulic system component which can be tested according to the present invention.

FIG. 1 illustrates, in schematic form, a typical actuator assembly which can be tested according to the present invention, the assembly being illustrated in FIG. 1 in its assembled and operative configuration.

The illustrated assembly includes a hydraulically driven actuator 2 constituted by a cylinder divided into two chambers by an operating piston 4 which is mechanically coupled, via an associated piston rod, to a steam valve which is to be controlled. The position of piston 4 is indicated by an inductive transducer 6 having a movable part which is mechanically coupled to the rod of piston 4. A signal indicating the position of piston 4 is supplied from transducer 6, via a demodulator 8, to a summing stage 10 which additionally receives a signal indicative of the desired position of piston 4 within its associated cylinder. A difference signal indicative of the difference between desired and actual positions is supplied via a servo amplifier to a servo valve 12 which controls the delivery of a high pressure hydraulic fluid to the lower cylinder chamber of actuator 2.

Hydraulic fluid under pressure is supplied to an input port of valve 12 via a system inlet line 14, a manually operated isolation valve, a filter and a valve inlet line 16. An outlet port of valve 12 is connected via a line 18 to be in communication with the lower cylinder chamber of actuator 2. Valve 12 has a drain port connected via a line 20 and a check valve 22 to a system drain. Line 20 is additionally connected to the upper cylinder chamber of actuator 2.

The valve (not shown) connected to piston 4 is spring biased in a manner to urge piston 4 downwardly.

When servo valve 12 receives a control signal indicating that piston 4 is to be moved upwardly, its inlet and outlet ports are connected internally in order to supply high pressure fluid to the lower cylinder chamber of actuator 2. Piston 4 then moves upwardly until the desired position is reached, at which time the communication between the inlet and outlet ports of servo valve 12 is closed and valve 12 blocks the outlet port. When servo valve 12 receives a control signal indicating that piston 4 is to be moved downwardly, its outlet and drain ports are connected internally to allow fluid in the lower cylinder chamber of actuator 2 to flow to the drain.

The system further includes a dump valve 24 which is provided to permit rapid closing of the valve controlled by actuator 2 under emergency conditions. Dump valve 24 includes a movable valve element 26 carrying two valve seats 28 and 30. Valve element 26 is operated by fluid supplied via a line 32 connected to valve inlet line 16 via an orifice. Line 32 is additionally connected, via a check valve 34 to a line 36 which is normally supplied with emergency trip fluid at a selected high pressure.

Under normal operating conditions, dump valve 24 remains in the closed condition shown in FIG. 1 and does not participate in control of actuator 2.

If an emergency trip condition should arise, line 36 will be connected to the system drain, so that the fluid pressure on valve element 26 is released, whereupon valve element 26 can move to its open condition under the influence of a compression spring acting on valve seat 30. This opens the passage which is normally closed by valve seat 28, permitting fluid in the lower cylinder chamber of actuator 2 and in line 18 to flow off to the system drain, and thus permitting rapid displacement of piston 4 downwardly under the influence of the spring biasing of the valve which is coupled to operating piston 4.

In order to test such an assembly when the system in which it is connected is not in operation, lines 36 and 14, and the line connected between the valve 22 and the system drain, which are normally connected to fittings of the assembly by flexible hoses, are disconnected at points A, B, and C and appropriate lines of the test system according to the invention are connected to those points. Hydraulic fluid identical in composition to that used in the system is then supplied at selected pressures to the fittings which were previously connected to lines 14 and 36, while the assembly fitting at point C, downstream of valve 22, is connected to a drain element of the test apparatus. Electrical signals are applied to servo valve 12 to place it in any selected operating state, and pressure differential and flow rate measurements are carried out and recorded, for example on a strip chart.

Figure 2:
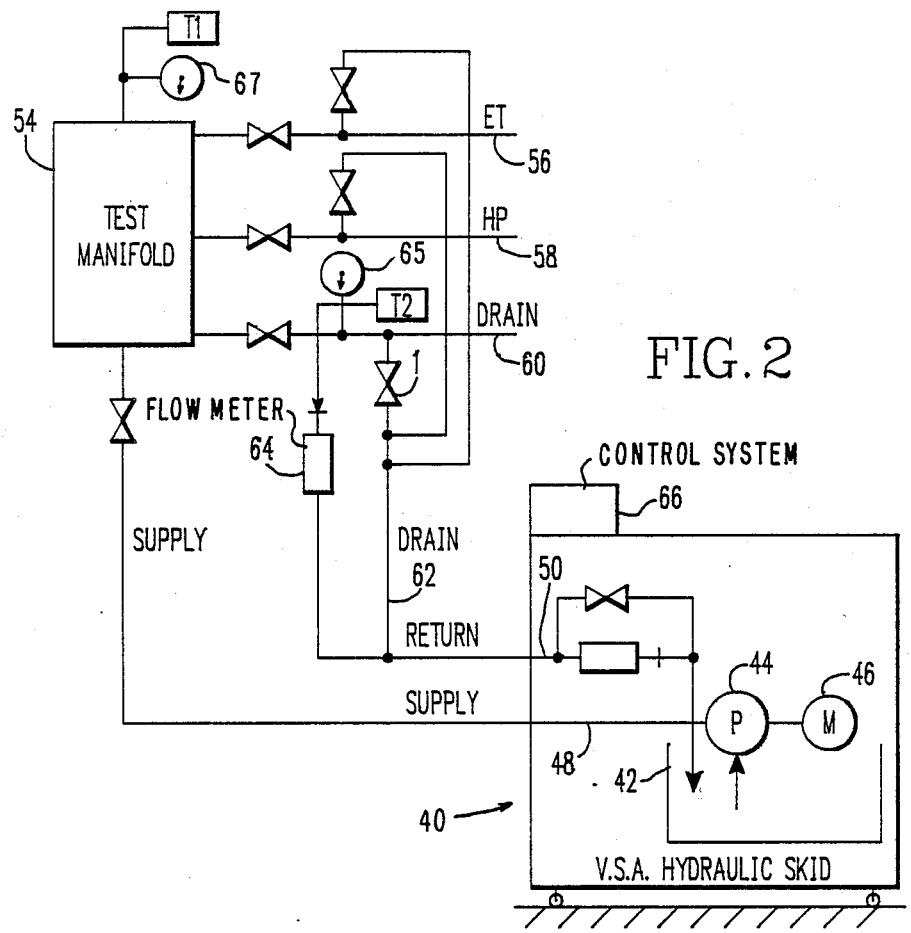
FIG. 2 is a schematic diagram of a test system according to the invention.

FIG. 2 is a schematic pictorial view of test apparatus according to the invention. This apparatus includes a portable hydraulic unit 40 mounted on rollers to be moved to a test location. Unit 40 contains a reservoir 42 holding a body of hydraulic fluid, a pump 44 driven by a motor 46 for supplying hydraulic fluid under pressure from reservoir 42, and a return line 50 via which hydraulic fluid can be returned to reservoir 42 via suitable valves and filters.

Supply line 48 is coupled to a test manifold 54 via which hydraulic fluid under pressure can be supplied to any one of three outlet lines 56, 58 and 60 via appropriate valves. In FIG. 2, line 56 is designated the emergency trip fluid line, line 58 the high pressure operating fluid line and line 60 the drain line. Each of these lines is additionally selectively connectable by a respective valve to a drain line 62 which is connected directly to line 50.

A flow meter 64 is connected between drain line 60 and return line 50, a first pressure gauge 65 is connected to drain line 60 and a second pressure gauge 67 is coupled to manifold 54 to monitor the pressure on line 48. Each pressure gauge is further associated with a transducer T1, T2 for producing electrical pressure indicating signals. Additional flow meters may be connected, if desired, in lines 56 and 58.

In order to test an actuator assembly as shown in FIG. 1 with the apparatus of FIG. 2, the actuator assembly of FIG. 1 would be disconnected from its associated hydraulic system at points A, B and C, and these points would be connected to lines 56, 58 and 60, respectively, of the apparatus of FIG. 2. Then, pump 44 would be placed into operation and the various valves associated with test manifold 54 would be opened or closed, as needed, to establish fluid pressure conditions corresponding to those encountered during normal operation. Suitable control signals would be supplied to servo valve 12 either by the electrical control system of the equipment under test or by a separate electrical control system 66 forming part of the apparatus of FIG. 2 and carried by skid 40. Control system 66 would be constructed according to principles known in the art in order to be adjustable to provide control signals for any type of actuator which is to be tested.

During a testing operation, changes in the pressure differential, as indicated by gauges 65 and 67, or by transducers T1 and T2 would be monitored, along with the rate of fluid flow through drain line 60, by flow meter 64, and the resulting readings would provide an indication of the operating condition of the actuator.

If the readings obtained in this manner indicate a defective operating state, for example excessive hydraulic fluid leakage to drain line 60, the next step in a test procedure according to the present invention would involve disconnecting lines 56, 58 and 60 from points A, B and C, disconnecting servo valve 12 from actuator 2, closing the fittings at points A, B and C, and connecting lines 56, 58 and 60 to additional fittings provided in the actuator at points D, E and F. Again, the valves associated with manifold 54 are set to establish the desired hydraulic conditions and pressure and fluid flow readings are taken. These readings are indicative of the operating condition of actuator 2 and dump valve 24, and the difference between those readings and the readings taken previously would be indicative of the operating condition of servo valve 12.

It might additionally be noted that by making appropriate connections between selected ones of lines 56, 58 and 60 and points C and F, or points A and D, or points B and D, the operating conditions of valve 22, valve 34 and the isolation valve can be individually tested.

In each case, the test can be performed in two stages. During the first stage, with the requisite hydraulic fluid pressures established on lines 56 and 58, and the test manifold valve 1 closed, the flow through meter 64 is measured. This is an indication of the rate of leakage through the components being tested. Then, the valve connecting test manifold 54 to line 48 is closed and the change in pressure indicated by gauge 67 or transducer T1 is monitored over a predetermined period of time until a predetermined pressure level is reached. The rate of decrease in pressure will be indicative of the condition of the components being tested, depending on the operating state which has been established for that test.

Figure 3:
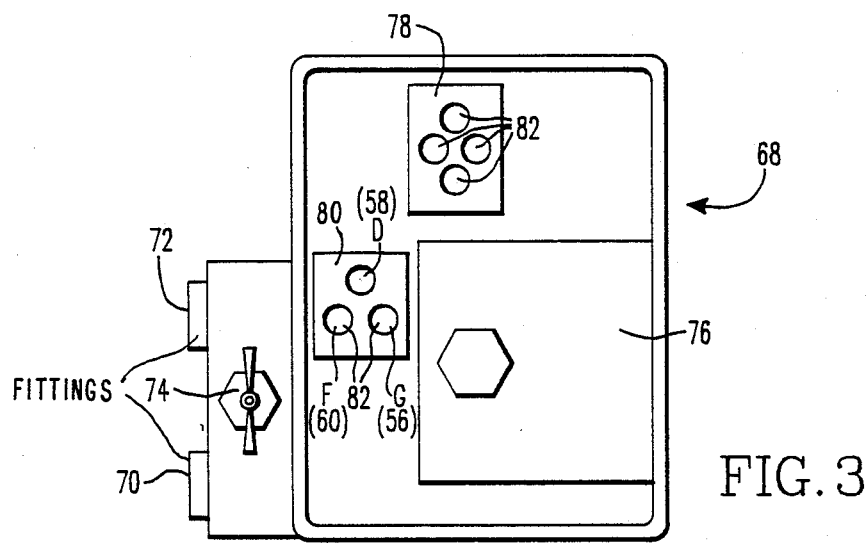
FIG. 3 is a pictorial view of a hydraulic system component which can be tested according to the invention, equipped with special components, according to the invention for permitting subcomponent testing.

The manner in which an actuator assembly can be modified, according to the present invention, to allow lines 56, 58 and 60 to be connected at points D, E and F will be explained with reference to FIG. 3 which shows an actuator block 68 for an actuator of the type illustrated in FIG. 1, with a cover plate of the block removed.

Actuator block 68 is provided with a drain fitting 70 and an emergency trip fluid supply fitting 72, as well as a high pressure fluid supply fitting which is on the rear surface of block 68 and is therefore not visible. The control handle 74 for the actuator isolation valve extends from block 68. Dump valve 24 (FIG. 1) is disposed behind a cover plate 76. When the actuator assembly is fully assembled, servo valve 12 is disposed at the location where and adapter plate 78 according to the invention is shown. A further plate 80 disposed in block 68 will be described in greater below.

For testing the complete actuator, with servo valve 12 in place, lines 56, 58 and 60 (FIG. 2) are connected to corresponding one of the fittings 70 and 72, as well as the high pressure fluid supply fitting provided on block 68 and the various tests described above are performed while appropriate control signals are supplied to servo valve 12. If these tests indicate that the actuator is defective, then, according to the invention, servo valve 12 is removed and replaced by special adapter plate 78 which is provided with fittings 82 and associated passages which communicate with lines 16, 18 and 20, as shown in FIG. 1. Then lines 56, 58 and 60 are disconnected from the actuator external fittings and reconnected to appropriate ones of fittings 82. The actuator external fittings are plugged as is any unused one of fittings 82. Then, under control of the valves associated with test manifold 54 (FIG. 2) appropriate fluid pressures are applied to the connected fittings 82 and the readings described above are taken again. Comparison of these readings with those previously taken will indicate whether the defect is in servo valve 12 or in one of the other components of the actuator.

In a similar manner, dump valve 24 can be individually tested with the aid of further adapter plate 80 provided with three fittings 82. These fittings 82 are connected, internally of the actuator assembly, to points D, F and G shown in FIG. 1. To test dump valve 24, the fittings connected to points D, F and G are connected to lines 58, 60 and 56, respectively. If the actuator assembly is constructed such that the orifice shown in FIG. 1 is removed, a substitute orifice can be provided in plate 80 between the fittings associated with points D and G. When connections are made to the fittings of plate 80, the fittings of plate 78 are plugged.

In further accordance with the invention, individual components of the actuator can be tested, as described above, by appropriate connection of lines 56, 58 and 60 to various combinations of fittings 70, 72, 82 and the high pressure fluid supply fitting of block 68, with the unused fittings being plugged.

The invention can also be applied to other types of actuators including those which do not include a servo valve, but which do have an element known as a valve test solenoid valve which would be disposed at the location of plate 80. In this case, there would be no plate or opening at the location of plate 78 and to test the actuator with the valve test solenoid valve removed, the second adapter plate, or orifice plate, 80 would be installed, this plate being provided with three fittings 82. As previously described, lines 56, 58 and 60 (FIG. 2) would be connected to appropriate ones of fittings 82 in plate 80, all other fittings being plugged, and testing would be performed in the manner described above.

Thus, the present invention, by providing a portable test system and special adapter, or orifice, plates enable a wide variety of actuators, as well as individual actuator components, to be tested without being removed from the system from which they are installed.

Investigations conducted thus far have revealed that apparatus according to the invention is capable of fully testing a variety of devices including servo valves, such as those marketed by the Moog Corporation and commonly known as "Moog" valves, high pressure isolation valves, drain check valves, trip header check valves, valve test solenoid valves, actuators and adjustable and nonadjustable dump valves. In addition, it is anticipated that apparatus according to the invention can be used for testing OPC solenoid valves, emergency trip solenoid valves, interface valves, high pressure accumulators, electrohydraulic reservoir check valves and high pressure filters, as well as the hydraulic circuits of air pilot valves.

While the invention is particularly intended for the testing of components employed in electrohydraulic systems, that is systems containing hydraulic components which are electrically actuated, the invention could also be applied for testing components for purely hydraulic systems.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method for testing an hydraulic device of an hydraulic control system, the system having a source of hydraulic fluid under pressure and a fluid reservoir, and the device having a fluid inlet which is releasably coupled to the source when the system is in operation, a fluid outlet which is releasably coupled to the reservoir when the system is in operation, and an element which restricts fluid flow between the inlet and the outlet, said method comprising:

halting operation of the system;

providing a portable analyzing apparatus having a supply of hydraulic fluid, an outlet conduit, means for supplying hydraulic fluid under pressure from the supply to the outlet conduit, a return conduit communicating with the supply, means connected for monitoring fluid pressure in the outlet conduit, and means connected for monitoring fluid flow through the return conduit;

disconnecting the fluid inlet of the device from the source and connecting that fluid inlet to the outlet conduit;

disconnecting the fluid outlet of the device from the reservoir and connecting that fluid outlet to the return conduit;

placing the means for supplying hydraulic fluid under pressure into operation for supplying hydraulic fluid under pressure to the outlet conduit; and monitoring the fluid pressure in the outlet conduit and the flow of fluid through the return conduit with the monitoring means.

2. A method as defined in claim 1 further comprising, after said step of placing and before said step of monitoring, blocking flow of fluid through the outlet conduit at a location upstream of the means for monitoring fluid pressure, and wherein said step of monitoring includes monitoring fluid pressure during a selected time period after said blocking step.

3. A method as defined in claim 2 wherein the device is electrically operable to assume different operating states and wherein said step of monitoring is performed when the device is in different operating states.

4. A method as defined in claim 1 wherein the device is composed of a plurality of hydraulic components and at least one of the components is removable from the remainder of the device, and comprising the further steps of:

removing at least one component from the remainder of the device;

securing to the device a plate having passages communicating with fluid passages in the remainder of the device;

connecting the outlet conduit and the return conduit to respective passages of the plate; and repeating said steps of placing and monitoring.

5. Apparatus for analyzing an hydraulic device of an hydraulic control system, the device having a fluid inlet, a fluid outlet, an element which restricts fluid flow between the inlet and outlet, and conduit connection fittings coupled to the fluid inlet and outlet, said apparatus comprising:

a movable carrier which is movable to the location of the device;

a container for a supply of hydraulic fluid carried by said carrier;

pumping means carried by said carrier for withdrawing hydraulic fluid from said container and placing the withdrawn fluid under pressure;

a supply line coupled to said pumping means to receive hydraulic fluid under pressure;

a return line communicating with said container;

fluid distributing means connected to said supply line and said return line and including a manifold; and means for connecting said manifold to the fluid inlet and fluid outlet of the device.

6. Apparatus as defined in claim 5 wherein the device has a plurality of components each having a passage provided with a respective element which restricts fluid flow through the passage, and said apparatus further comprises an adapter plate mountable on the device, after one component is removed, for connection of said connecting means to the remainder of the device.

* * * * *